United States Patent
Balistreri et al.

(10) Patent No.: US 9,945,387 B2
(45) Date of Patent: Apr. 17, 2018

(54) CONDENSER FAN SPEED CONTROL FOR AIR CONDITIONING SYSTEM EFFICIENCY OPTIMIZATION

(75) Inventors: Michael Balistreri, Baldwinsville, NY (US); Eugene D. Daddis, Jr., Manlius, NY (US); Kenneth J. Nieva, Baldwinsville, NY (US)

(73) Assignee: CARRIER CORPORATION, Farmington, CT (US)

( * ) Notice: Subject to any disclaimer, the term of this patent is extended or adjusted under 35 U.S.C. 154(b) by 1044 days.

(21) Appl. No.: 14/127,747

(22) PCT Filed: Jun. 20, 2012

(86) PCT No.: PCT/US2012/043282
§ 371 (c)(1),
(2), (4) Date: Dec. 19, 2013

(87) PCT Pub. No.: WO2012/177720
PCT Pub. Date: Dec. 27, 2012

(65) Prior Publication Data
US 2014/0140810 A1    May 22, 2014

Related U.S. Application Data

(60) Provisional application No. 61/499,942, filed on Jun. 22, 2011.

(30) Foreign Application Priority Data

Jun. 20, 2012   (WO) ................ PCT/US2012/043282

(51) Int. Cl.
*F04D 19/00*    (2006.01)
*F04D 27/00*    (2006.01)
(Continued)

(52) U.S. Cl.
CPC ......... *F04D 27/004* (2013.01); *F04D 19/002* (2013.01); *F24F 11/006* (2013.01);
(Continued)

(58) Field of Classification Search
CPC .... F04D 19/002; F04D 27/004; F24F 11/006; F24F 11/0012; F24F 11/0017;
(Continued)

(56) References Cited

U.S. PATENT DOCUMENTS 4,257,238 A   3/1981   Kountz et al.
4,307,576 A   12/1981  Takano et al.
(Continued)

FOREIGN PATENT DOCUMENTS

| | | |
|---|---|---|
| EP | 1942306 A1 | 7/2008 |
| EP | 2320151 A1 | 5/2011 |
| GB | 2291181 A | 1/1996 |

OTHER PUBLICATIONS

International Preliminary Report on Patentability dated Dec. 23, 2013—International Application No. PCT/US2012/043282; International Filing Date Jun. 20, 2012; 7 pages.
(Continued)

*Primary Examiner* — Jason Shanske
*Assistant Examiner* — Christopher R Legendre
(74) *Attorney, Agent, or Firm* — Cantor Colburn LLP

(57) ABSTRACT

A method for fan speed control for a condenser fan in an air conditioning system includes determining a refrigerant condition at an inlet of a compressor by a condenser fan speed control module; determining a refrigerant condition at an outlet of the compressor by the condenser fan speed control module; determining a parabolic curve of a relationship between an air conditioning system performance metric and a speed of the condenser fan based on the determined inlet condition and the determined outlet condition by the con-
(Continued)

denser fan speed control module; identifying an optimum condenser fan speed based on a vertex of the parabolic curve by the condenser fan speed control module; and controlling the speed of the condenser fan to meet the optimum fan speed by the condenser fan speed control module.

19 Claims, 5 Drawing Sheets

(51) Int. Cl.
| | |
|---|---|
| *F24F 11/00* | (2006.01) |
| *F24F 11/02* | (2006.01) |
| *F25B 49/02* | (2006.01) |

(52) U.S. Cl.
CPC ...... *F24F 11/0079* (2013.01); *F24F 11/0086* (2013.01); *F24F 11/027* (2013.01); *F25B 49/027* (2013.01); *F24F 11/0017* (2013.01); *F24F 2011/0075* (2013.01); *F25B 2600/111* (2013.01); *F25B 2700/1931* (2013.01); *F25B 2700/1933* (2013.01); *F25B 2700/21151* (2013.01); *F25B 2700/21152* (2013.01); *F25B 2700/21162* (2013.01); *F25B 2700/21163* (2013.01); *Y02B 30/743* (2013.01); *Y02B 30/746* (2013.01); *Y02B 30/78* (2013.01)

(58) Field of Classification Search
CPC .. F24F 11/0076; F24F 11/0079; F24F 11/027; F24F 2011/0045; F24F 2011/0061; F24F 2011/0063; F24F 2011/0075; F24F 2011/008; F24F 2011/0083; F25B 49/022; F25B 49/027; F25B 2600/025; F25B 2600/0253; F25B 2700/193; F25B 2700/195; F25B 2700/21151; F25B 2700/21152; F25B 2700/21162; F25B 2700/21163; Y02B 30/743; Y02B 30/746; Y02B 30/78
See application file for complete search history.

(56) References Cited

U.S. PATENT DOCUMENTS

| | | | | |
|---|---|---|---|---|
| 5,605,053 | A | * | 2/1997 | Otori .................... F24F 11/0009 62/160 |
| 5,752,391 | A | * | 5/1998 | Ozaki .................. B60H 1/3204 62/208 |
| 5,797,729 | A | | 8/1998 | Rafuse, Jr. et al. |
| 6,363,735 | B1 | | 4/2002 | Bushnell et al. |
| 6,591,621 | B2 | | 7/2003 | Young et al. |
| 6,651,451 | B2 | | 11/2003 | Cho et al. |
| 7,469,546 | B2 | * | 12/2008 | Kates ................... F24F 11/0086 165/11.1 |
| 7,618,233 | B2 | | 11/2009 | Parker et al. |
| 8,087,258 | B2 | * | 1/2012 | Toyoshima ............. F25B 45/00 62/127 |
| 8,484,990 | B2 | * | 7/2013 | Ballet ....................... F25B 1/10 62/181 |
| 8,825,184 | B2 | * | 9/2014 | Burns ....................... F25B 5/02 236/49.3 |
| 9,182,154 | B2 | * | 11/2015 | Burns ....................... F25B 1/00 |
| 2006/0201168 | A1 | | 9/2006 | Kates |
| 2009/0277196 | A1 | | 11/2009 | Gambiana et al. |
| 2009/0277197 | A1 | | 11/2009 | Gambiana et al. |
| 2010/0094434 | A1 | * | 4/2010 | Ballet ....................... F25B 1/10 700/28 |
| 2011/0132011 | A1 | * | 6/2011 | Kojima ................ F24F 11/0079 62/180 |
| 2014/0140810 | A1 | * | 5/2014 | Balistreri .............. F04D 19/002 415/1 |

OTHER PUBLICATIONS

International Application No. PCT/US2012/043282 Filed Jun. 20, 2012; Notification of Transmittal of The International Search Report and The Written Opinion of The Internation Searching Authority, or the Declaration; dated Sep. 3, 2012; 4 pages.

Written Opinion of the International Searching Authority dated Sep. 3, 2012; International Application No. PCT/US2012/043282; Filed Jun. 20, 2012; 7 pages.

* cited by examiner

CONDENSER FAN SPEED CONTROL FOR AIR CONDITIONING SYSTEM EFFICIENCY OPTIMIZATION

CROSS REFERENCE TO RELATED APPLICATION

This application is a National Stage Application of International Application No. PCT/US2012/043282, which was filed on Jun. 20, 2012, and which claims priority to U.S. Provisional Application No. 61/499,942, filed on Jun. 20, 2011, the contents of both of which are herein incorporated by reference in their entirety.

FIELD OF INVENTION

The subject matter disclosed herein relates generally to the field of condenser fan speed control to optimize the efficiency of the performance of an outdoor air conditioning system.

DESCRIPTION OF RELATED ART

An outdoor, or rooftop, air conditioning system may include multiple outdoor condenser units. Air conditioning systems run at less than full load the majority of the time, for example, during relatively low ambient temperatures. When the air conditioning unit is running at less than full load, one or more of the condensers may be turned off. Airflow through a condenser unit is controlled by associated condenser fans. A condenser fan is also typically turned off when its associated condenser unit is not in use or requires less airflow to reduce the overall power consumption of the air conditioning system. However, turning off the condenser fan may be inefficient due to air bypass through the fan opening. Air bypass through the fan opening may be prevented by operating the condenser fan to maintain head pressure in the condenser. A variable frequency drive (VFD) for the condenser fans may be added to allow operation of the condenser fan at relatively low speeds to maintain a certain head pressure in a turned-off condenser, preventing air bypass when the associated condenser is not in use. However, large rooftop air conditioning systems with multiple banks of condenser fans may waste energy in powering the condenser fans at partial load conditions, because the condenser fans are controlled to maintain a certain head pressure in the various condenser units without regard to other conditions in the air conditioning system and to the operating efficiency of the system.

BRIEF SUMMARY

According to one aspect of the invention, a method for fan speed control for a condenser fan in an air conditioning system includes determining a refrigerant condition at an inlet of a compressor by a condenser fan speed control module; determining a refrigerant condition at an outlet of the compressor by the condenser fan speed control module; determining a parabolic curve of a relationship between an air conditioning system performance metric and a speed of the condenser fan based on the determined inlet condition and the determined outlet condition by the condenser fan speed control module; identifying an optimum condenser fan speed based on a vertex of the parabolic curve by the condenser fan speed control module; and controlling the speed of the condenser fan to meet the optimum fan speed by the condenser fan speed control module.

According to another aspect of the invention, a condenser fan speed control module for a condenser fan in an air conditioning system includes a first connection to an inlet sensor located at a refrigerant inlet of a compressor of the air conditioning system; a second connection to an outlet sensor located at a refrigerant outlet of the compressor; and a third connection to a condenser fan of the air conditioning system; wherein the condenser fan speed control module is configured to determine a parabolic curve of a relationship between an air conditioning system performance metric and a fan speed of the condenser fan based on data from the inlet sensor and the outlet sensor, to identify an optimum condenser fan speed based on a vertex of the parabolic curve, and to control the speed of the condenser fan to meet the optimum fan speed via the third connection.

According to another aspect of the invention, a computer program product comprising a computer readable storage medium containing computer code that, when executed by a computer, implements a method for fan speed control for a condenser fan in an air conditioning system including determining a refrigerant condition at an inlet of a compressor of the air conditioning system; determining a refrigerant condition at an outlet of the compressor; determining a parabolic curve of a relationship between an air conditioning system performance metric and a speed of the condenser fan based on the determined inlet condition and the determined outlet condition; identifying an optimum condenser fan speed based on a vertex of the parabolic curve; and controlling the speed of the condenser fan to meet the optimum fan speed.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
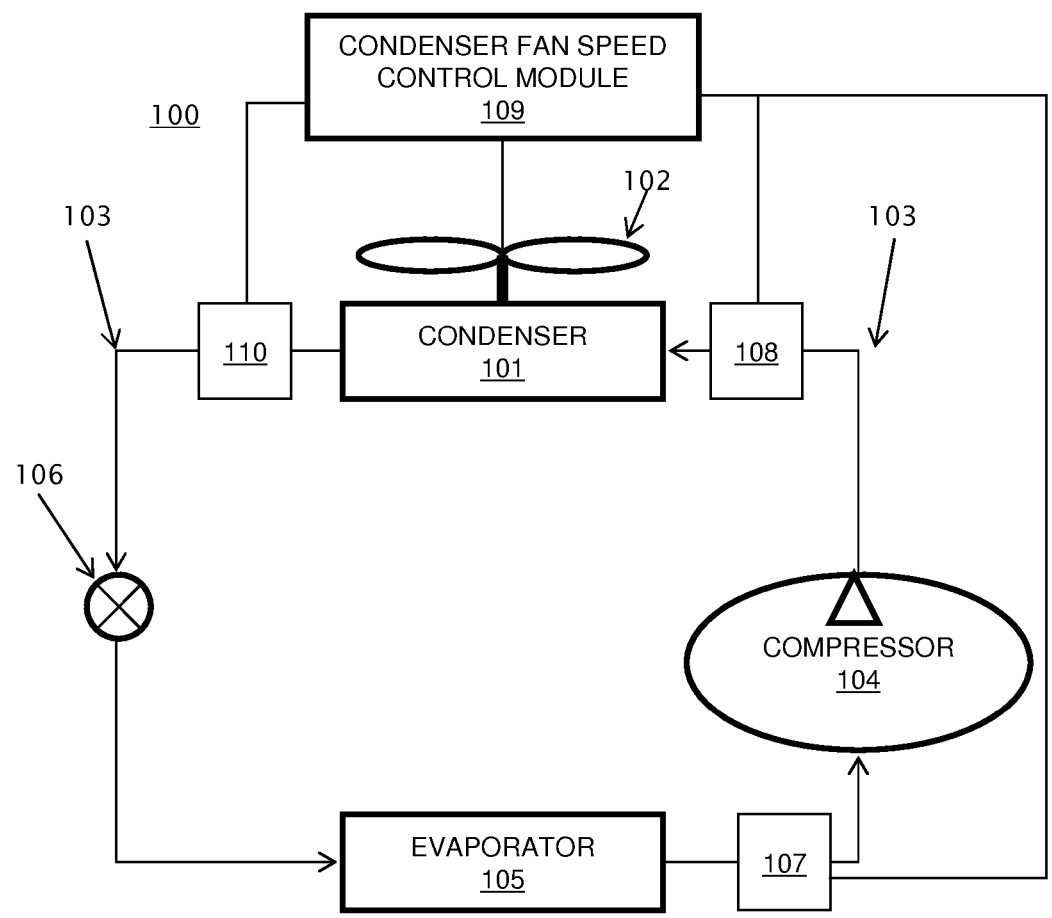
FIG. 1 is a block diagram illustrating an embodiment of an air conditioning system with a variable speed condenser fan and a condenser fan speed control module.

Embodiments of systems and methods for condenser fan speed control efficiency optimization for an air conditioning system are provided, with exemplary embodiments being discussed below in detail. An increase in condenser fan speed will increase the amount of airflow in the condenser, while a decrease in condenser fan speed will reduce the amount of airflow through the condenser. Since the heat transfer coefficient of the condenser is proportional to the rate of air flow through the condenser heat exchanger coil, the overall heat transfer performance of the condenser can be adjusted by increasing the air flow passing through the condenser to increase the heat transfer between the air flow and the refrigerant, or by decreasing the air flow passing through the condenser to decrease the heat transfer between the air flow and the refrigerant. The speed of a condenser fan having a VFD may therefore be controlled to increase the overall efficiency of the air conditioning system.

An air conditioning system's energy efficiency ratio (EER) is defined as the total capacity of the air conditioning system divided by the power consumption of the air conditioning system. The relationship between EER and condenser fan speed at a particular set of operating conditions for each condenser in the air conditioning system follows a parabolic curve; the vertex, or peak, of the parabolic curve gives the condenser fan speed at which the EER of the air conditioning system is maximized for the particular conditions. Each point on the parabolic curve may be determined based on the current speed and power consumption of the condenser fan, the power consumption of the compressor, and the compressor capacity. The compressor capacity and power are calculated based on current conditions, such as temperature or pressure, at the refrigerant inlet to the compressor, at the refrigerant outlet of the compressor, and in some embodiments, at the refrigerant outlet of the condenser. Once the parabolic curve is calculated for the current conditions, the optimum condenser fan speed may be determined by adjusting the condenser fan speed until it reaches the vertex of the parabolic curve (where the slope of the curve equals zero). In another embodiment, the parabolic curve may be pre-calculated based on known system characteristics. In such an embodiment, the current condenser fan speed is compared to the optimum condenser fan speed determined from the pre-calculated parabolic curve, and the current condenser fan speed is raised or lowered to meet the optimum fan speed. Also, as the capacity of some types of air conditioning systems may be constant over a wide range of operating conditions, a parabolic curve of the relationship between the total power consumption of the air conditioning system and the condenser fan speed may be determined based on the current conditions at the refrigerant inlet and outlet to the compressor, and the optimum fan speed may be determined from the vertex of the power consumption curve. The power consumption parabolic curve may take into account the power consumption of the condenser fan. An optimal condenser fan speed for each condenser fan in the air conditioning system may therefore be determined under any environmental conditions.

FIG. 1 shows an embodiment of an air conditioning system 100 including a module for controlling the condenser fan speed. Air conditioning system 100 includes a condenser 101 with a condenser fan 102, an expansion device 106, an evaporator 105, and a compressor 104; these are linked by refrigerant lines 103. The refrigerant flows in refrigerant lines 103 from compressor 104 into the inlet of condenser 101, and from the outlet of condenser 101 to the expansion device 106. Sensor 107 is located at the refrigerant inlet of compressor 104, sensor 108 is located at the refrigerant outlet of compressor 104, and optional sensor 110 is located at the refrigerant outlet of condenser 101. The sensors 107, 108, and 110 may measure the refrigerant temperatures in some embodiments, and may comprise, for example, thermoresistors or thermocouples. In other embodiments, sensors 107, 108, and 110 may measure the refrigerant pressures, and may comprise, for example, pressure transducers. The data from sensors 107, 108, and (optionally) 110 is received by condenser fan speed control module 109. Condenser fan speed control module 109 determines the optimum speed for condenser fan 102 based on the data from sensors 107, 108, and 110, determines the current speed of the condenser fan 102, and raises or lowers the speed of condenser fan 102 to meet the optimum speed. FIG. 1 is shown for illustrative purposes only; an air conditioning system may include any appropriate number of condensers and associated condenser fans, each condenser/condenser fan pair having an associated fan speed control module and inlet/outlet sensors.

Figure 2:
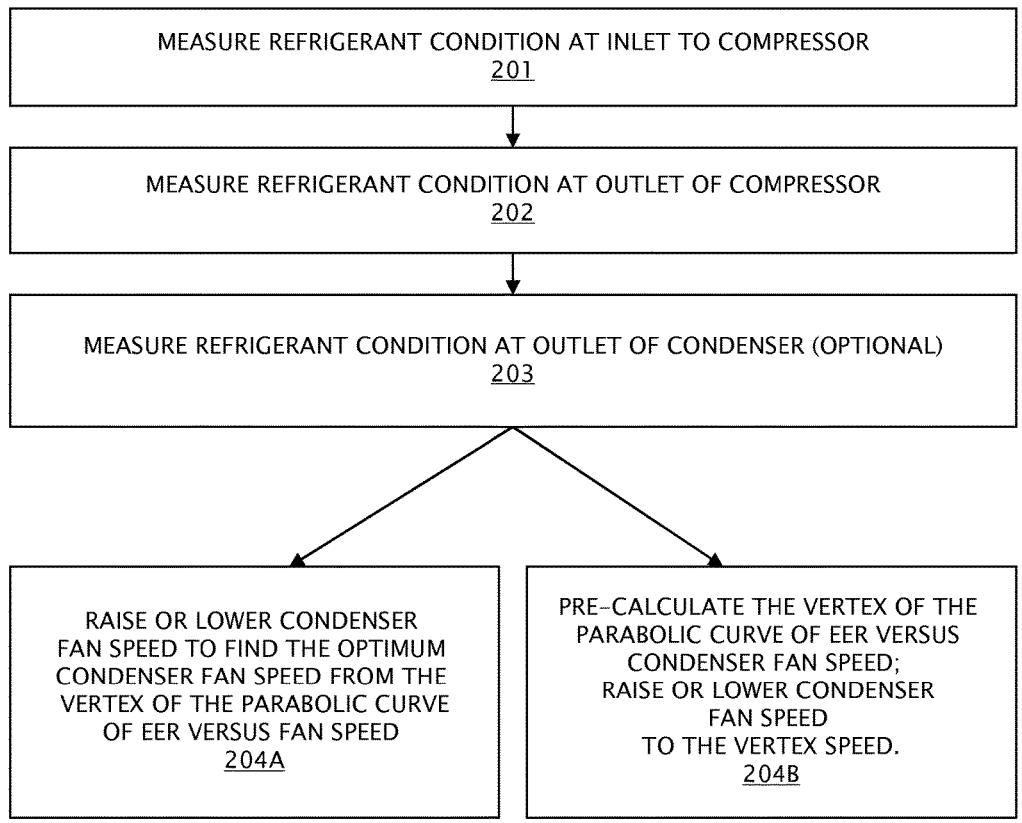
FIG. 2 is a flowchart illustrating an embodiment of a method for condenser fan speed control based on the air conditioning system energy efficiency ratio (EER).

FIG. 2 shows a flowchart of a method 200 for condenser fan speed control based on EER. FIG. 2 is discussed with respect to FIG. 1. In block 201, the refrigerant conditions at the inlet to the compressor 104 are measured by sensor 107. The temperature or pressure of the inlet refrigerant may be measured by sensor 107 in various embodiments. In block 202, the refrigerant conditions at the outlet of the compressor 104 are measured by sensor 108. The temperature or pressure of the outlet refrigerant may be measured by sensor 108 in various embodiments. In block 203, the refrigerant conditions at the refrigerant outlet of condenser 101 may be optionally measured by sensor 110. The optional temperature and/or pressure measurement of the outlet refrigerant of condenser 101 allows for increased accuracy in system EER calculations in some embodiments. The condenser fan speed may then be controlled as illustrated in blocks 204A or 204B. In block 204A, the speed of the condenser fan 102 is adjusted to determine the vertex of the parabolic curve of the relationship between EER for the air conditioning system 100 and speed of condenser fan 102. The EER is calculated as the condenser fan speed is adjusted by the condenser fan speed control module 109 based on data from sensors 107, 108, and (optionally) 110, and on the condenser fan power calculated using predetermined fan laws. Alternately, in block 204B, another embodiment is shown in which the parabolic curve may be pre-calculated by the condenser fan speed module 109 and the speed of condenser fan 102 may be raised or lowered directly to the pre-calculated vertex of the curve. Method 200 may be repeated at time intervals of any appropriate length during operation of the air conditioning system 100.

Figure 3:
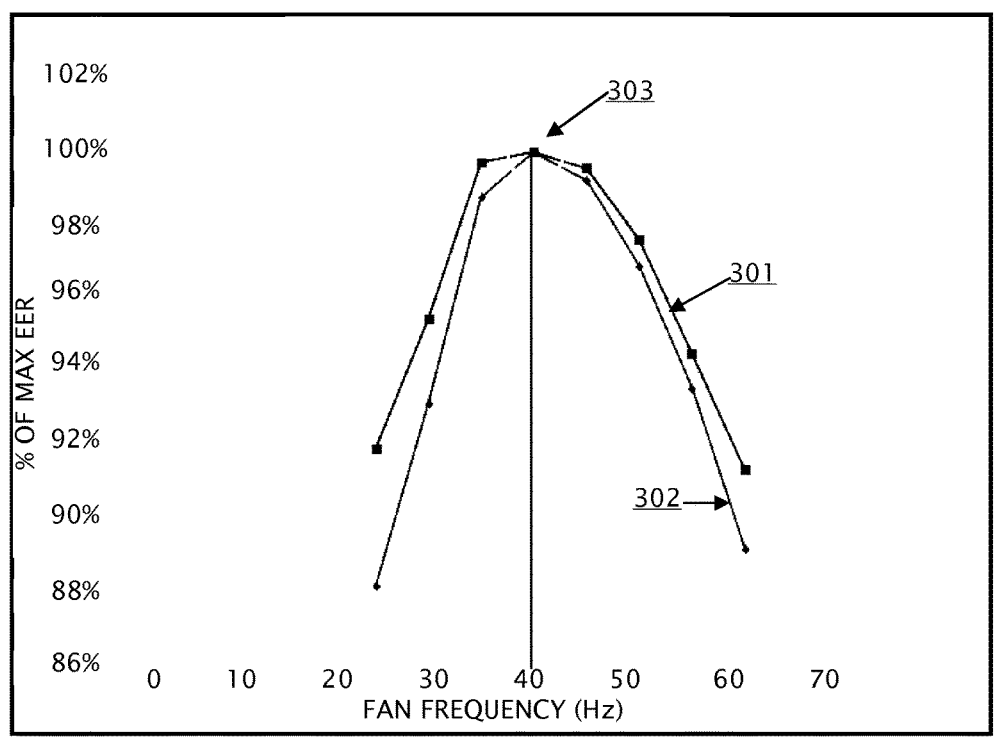
FIG. 3 illustrates an embodiment of a graph of EER versus condenser fan speed.

An example of parabolic curves showing EER versus condenser fan speed is shown in plot 300 in FIG. 3. Parabolic curve 302 shows the calculated relationship between EER and condenser fan speed (in hertz, or Hz), as is calculated in block 204B of FIG. 2, and parabolic curve 301 shows the actual relationship, as calculated in block 204A of FIG. 2. Point 303 is the vertex, or peak, of the both of parabolic curves 301 and 302, and gives an optimum fan speed of 40 Hz. The condenser fan speed may alternately be expressed in rotations per minute (RPM).

The EER is calculated based on the condenser fan speed using static information regarding the air conditioning system 100, including the type of condenser fan 102, the frequency (Hz) inlet to the fan or fan RPM, the nominal fan power at rating point, the size of compressor 101, and various constant polynomial coefficients associated with particular compressor 101. The condenser fan power consumption may be calculated from the frequency of an inverter powering the condenser fan 102 at a given time period, the fan type, and the nominal power of the condenser fan at 60 Hertz in some embodiments. In some embodiments, the power consumption of condenser fan 101 will be calculated based on changes in the condenser fan speed using fan law properties and the known fan power at its rated nominal speed. In some embodiments, the compressor capacity and power draw may be calculated using the following equation:

$$X = C_1 + C_2 \cdot (S) + C_3 \cdot D + C_4 \cdot (S^2) + C_5 \cdot (S \cdot D) + C_6 \cdot (D^2) + C_7 \cdot (S^3) + C_8 \cdot (D \cdot S^2) + C_9 \cdot (S \cdot D^2) + C_{10} \cdot (D^3) \quad \text{EQ. 1}$$

wherein $C_1$-$C_{10}$ are predetermined coefficients representing compressor performance for the particular compressor in the air conditioning system, S is the refrigerant saturated suction (inlet) temperature of the compressor, and D is the refrigerant saturated discharge (outlet) temperature from the compressor. X may represent any of the following variables: power consumption (in watts), mass flow rate (in pounds/hour or kilograms/second), current (in amperes), or compressor capacity (in Btu/hr or Kilowatts). In embodiments in which sensors 107, 108, and 110 measure the inlet and outlet pressure of the refrigerant, the inlet and outlet saturation temperature of the refrigerant may be determined by condenser fan speed control module 109 based on the measured inlet and outlet pressures for use in EQ. 1, as the refrigerant pressure and temperature for the particular refrigerant are directly proportional (i.e., using established gas laws). In some embodiments, the optimization algorithm may then use the known fan speed, calculated fan power, compressor power, and compressor capacity to determine the curve representing the relationship between the condensing unit performance (EER or power consumption) and condenser fan speed. The coefficients $C_1$-$C_{10}$ are predetermined constants for a particular compressor. Such coefficients may be programmed into the condenser fan speed control module 109 for each compressor in air conditioning system 100; different compressors may have different definitions for coefficients $C_1$-$C_{10}$.

Figure 4:
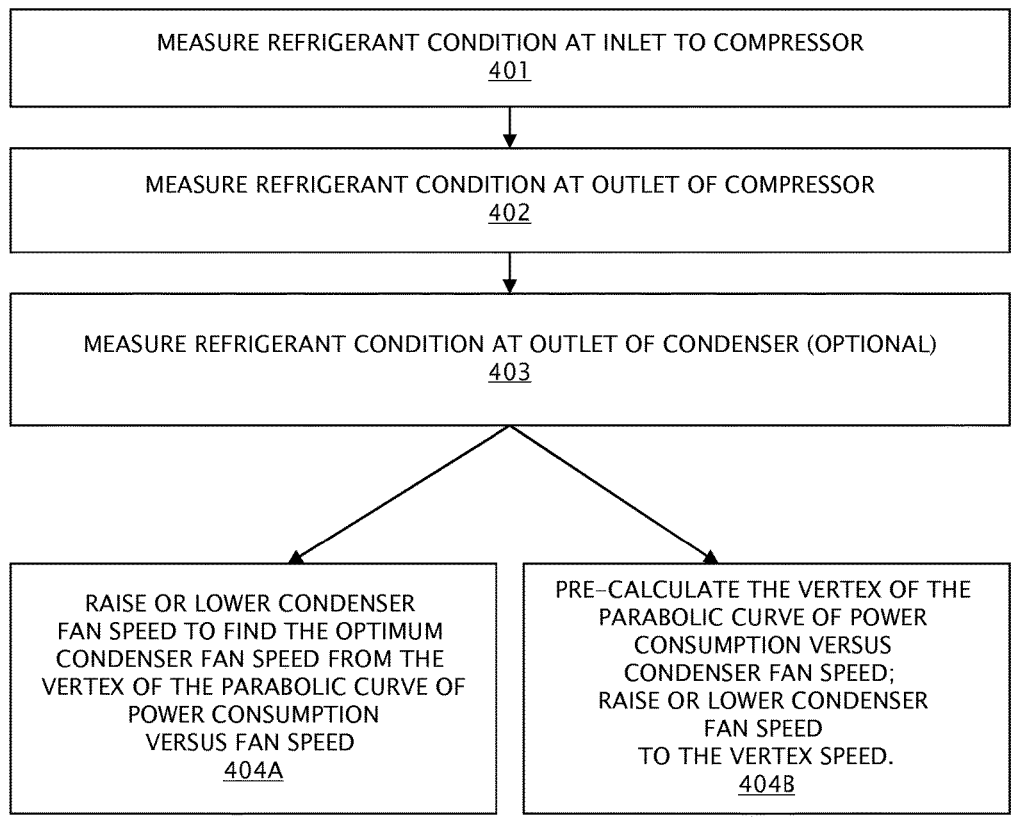
FIG. 4 is a flowchart illustrating an embodiment of a method for condenser fan speed control based on power consumption of the air conditioning system.

For air conditioning systems in which the compressor 104 includes a fixed volume index (VI) compressor (i.e., screw or scroll compressors), the relationship between power consumption and system capacity is relatively constant over a wide range of conditions. Hence, if the capacity is dropped from the EER calculation, the overall air conditioning system power consumption follows a parabolic curve as condenser fan speed is varied. Therefore, in another embodiment, the condenser fan speed control module 109 may determine the relationship between power consumption and the speed of condenser fan 102, as shown in FIG. 4. The total power consumption of the air conditioning system 100 may include the sum of the power consumption of the condenser fan 102 and the compressor 104. The delta compressor power and the delta fan power may also be determined; when these two values are equal the overall air conditioning system efficiency is at a maximum. FIG. 4 shows a flowchart of a method 400 for condenser fan speed control based on power consumption. FIG. 4 is discussed with respect to FIG. 1. In block 401, the refrigerant conditions at the inlet to the compressor 104 are measured by sensor 107. The temperature or pressure of the inlet refrigerant may be measured by sensor 107 in various embodiments. In block 402, the refrigerant conditions at the outlet of the compressor 104 are measured by sensor 108. The temperature or pressure of the outlet refrigerant may be measured by sensor 108 in various embodiments. In block 403, the refrigerant conditions at the refrigerant outlet of condenser 101 may be optionally measured by sensor 110. The optional temperature and/or pressure measurement of the outlet refrigerant of condenser 101 allows for increased accuracy in system capacity and power calculations in some embodiments. The condenser fan speed may then be controlled as illustrated in blocks 404A or 404B. In block 404A, the speed of the condenser fan 102 is adjusted to determine the vertex of the parabolic curve of the relationship between power consumption for the air conditioning system 100 and speed of condenser fan 102. The power consumption is calculated as the condenser fan speed is adjusted by the condenser fan speed control module 109 based on data from sensors 107, 108, and (optionally) 110, and on condenser fan power calculated using predetermined fan laws. Alternately, in block 404B, another embodiment is shown in which the parabolic curve may be pre-calculated by the condenser fan speed module 109 and the speed of condenser fan 102 may be raised or lowered directly to the pre-calculated vertex of the curve. The power consumption of condenser fan 102 may be taken into account in the curves calculated in blocks 404A and 404B; the condenser fan power consumption may be calculated from the frequency of an inverter powering the condenser fan 102 at a given time period, the fan type, and the nominal power of the condenser fan at 60 Hertz in some embodiments. Method 400 may be repeated at time intervals of any appropriate length during operation of the air conditioning system 100.

Figure 5:
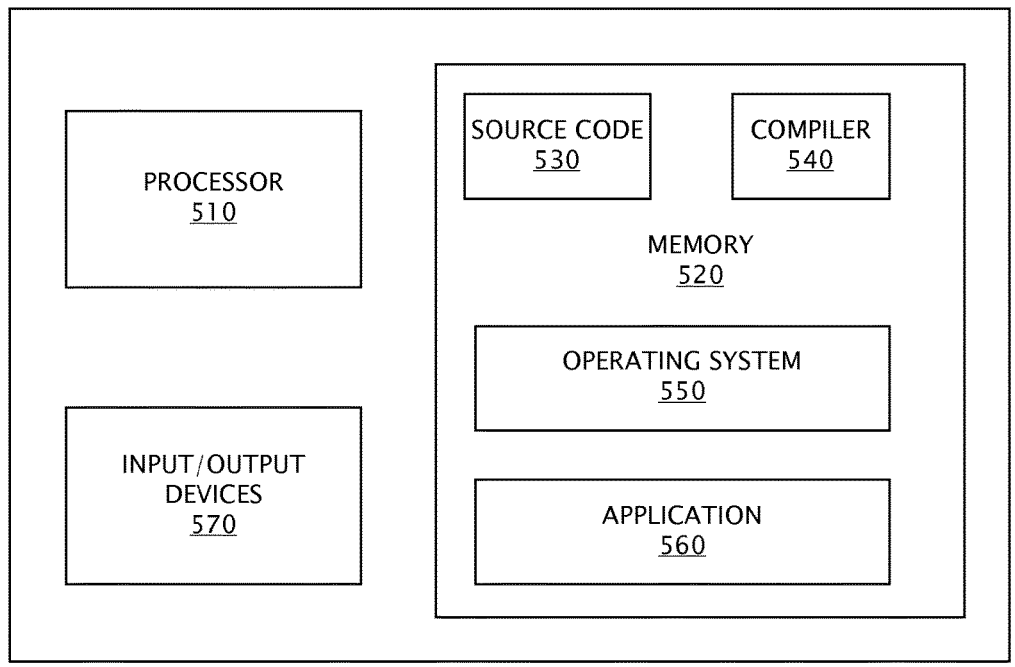
FIG. 5 is a block diagram illustrating a computer that may be used in conjunction with condenser fan speed control.

FIG. 5 illustrates an example of a computer 500 which may be utilized by exemplary embodiments of a method for condenser fan speed control as embodied in software. Various operations discussed above may utilize the capabilities of the computer 500. One or more of the capabilities of the computer 500 may be incorporated in any element, module, application, and/or component discussed herein, such as condenser fan speed control module 109.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more inlet and/or outlet (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, inlet-outlet control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include inlet devices such as, for example but not limited to, a mouse, keyboard, scanner, microphone, camera, etc. Furthermore, the I/O devices 570 may also include outlet devices, for example but not limited to a printer, display, etc. Finally, the I/O devices 570 may further include devices that communicate both inlets and outlets, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic inlet outlet system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include increased efficiency of operation of an outdoor air conditioning system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for fan speed control for a condenser fan in an air conditioning system, the method comprising:
   determining a sensed refrigerant condition at an inlet of a compressor of the air conditioning system by a condenser fan speed control module;
   determining a sensed refrigerant condition at an outlet of the compressor by the condenser fan speed control module;

determining a parabolic curve of a relationship between an air conditioning system performance metric and a speed of the condenser fan based on the determined inlet condition and the determined outlet condition by the condenser fan speed control module;

identifying an optimum condenser fan speed based on a vertex of the parabolic curve by the condenser fan speed control module; and controlling the speed of the condenser fan to meet the optimum condenser fan speed by the condenser fan speed control module.

2. The method of claim 1, wherein the inlet condition comprises the temperature of the refrigerant at the compressor inlet, and the outlet condition comprises the temperature of the refrigerant at the compressor outlet.

3. The method of claim 1, wherein the inlet condition comprises the pressure of the refrigerant at the compressor inlet, and the outlet condition comprises the pressure of the refrigerant at the compressor outlet.

4. The method of claim 3, further comprising determining a temperature of the refrigerant at the compressor inlet based on the pressure of the refrigerant at the compressor inlet, and determining a temperature of the refrigerant at the compressor outlet based on the pressure of the refrigerant at the compressor outlet by the condenser fan speed control module.

5. The method of claim 1, wherein the air conditioning system performance metric comprises an energy efficiency ratio (EER).

6. The method of claim 1, wherein the air conditioning system performance metric comprises power consumption of the air conditioning system.

7. The method of claim 5, wherein the power consumption of the air conditioning system is determined based on a power consumption of a compressor and a power consumption of the condenser fan.

8. The method of claim 1, wherein controlling the speed of the condenser fan to meet the optimum condenser fan speed comprises:

determining a current fan speed of the condenser fan;

raising the fan speed of the condenser fan in the event the current fan speed is lower than the optimum condenser fan speed; and lowering the fan speed of the condenser fan in the event the current fan speed is higher than the optimum condenser fan speed.

9. The method of claim 1, further comprising determining a refrigerant condition at an outlet of a condenser of the air conditioning system by the condenser fan speed control module; and determining the parabolic curve of the relationship between the air conditioning system performance metric and the speed of the condenser fan based on the determined compressor inlet condition, the determined compressor outlet condition, and the determined refrigerant condition at the outlet of the condenser.

10. A method for fan speed control for a condenser fan in an air conditioning system, the method comprising:

determining a sensed refrigerant condition at an inlet of a compressor of the air conditioning system by a condenser fan speed control module;

determining a sensed refrigerant condition at an outlet of the compressor by the condenser fan speed control module;

determining a parabolic curve of a relationship between an air conditioning system performance metric and a speed of the condenser fan based on the determined inlet condition and the determined outlet condition by the condenser fan speed control module;

identifying an optimum condenser fan speed based on a vertex of the parabolic curve by the condenser fan speed control module; and controlling the speed of the condenser fan to meet the optimum condenser fan speed by the condenser fan speed control module;

wherein identifying the optimum condenser fan speed based on the vertex of the parabolic curve by the condenser fan speed control module comprises adjusting the fan speed of the condenser fan and calculating the air conditioning performance metric as the fan speed of the condenser fan is adjusted to determine the vertex of the parabolic curve.

11. A condenser fan speed control module for a condenser fan in an air conditioning system, comprising:

a first connection to an inlet sensor located at a refrigerant inlet of a compressor of the air conditioning system;

a second connection to an outlet sensor located at a refrigerant outlet of the compressor; and a third connection to a condenser fan of the air conditioning system;

wherein the condenser fan speed control module is configured to determine a parabolic curve of a relationship between an air conditioning system performance metric and a fan speed of the condenser fan based on data from the inlet sensor and the outlet sensor, to identify an optimum condenser fan speed based on a vertex of the parabolic curve, and to control the speed of the condenser fan to meet the optimum condenser fan speed via the third connection.

12. The condenser fan speed control module of claim 11, wherein the inlet sensor and the outlet sensor each comprise one of a thermocouple and a thermoresistor.

13. The condenser fan speed control module of claim 11, wherein the inlet sensor and the outlet sensor each comprise pressure transducers.

14. The condenser fan speed control module of claim 13, wherein the condenser fan speed control module is further configured to determine a temperature of the refrigerant at the compressor inlet based on the data from the inlet sensor, and determine a temperature of the refrigerant at the compressor outlet based on the data from the outlet sensor.

15. The condenser fan speed control module of claim 11, wherein the air conditioning system performance metric comprises an energy efficiency ratio (EER).

16. The condenser fan speed control module of claim 11, wherein the air conditioning system performance metric comprises power consumption of the air conditioning system.

17. The condenser fan speed control module of claim 16, wherein the power consumption of the air conditioning system is determined by the condenser fan speed control module based on a power consumption of a compressor and a power consumption of the condenser fan.

18. The condenser fan speed control module of claim 11, further comprising a fourth connection to an additional outlet sensor located at a refrigerant outlet of a condenser of the air conditioning system, wherein the condenser fan speed control module is configured to determine the parabolic curve of the relationship between the air conditioning system performance metric and the fan speed of the condenser fan based on data from the inlet sensor, the outlet sensor, and the additional outlet sensor.

19. A computer program product comprising a non-transitory computer readable storage medium containing computer code that, when executed by a computer, implements a method for fan speed control for a condenser fan in an air conditioning system, wherein the method comprises:

determining a sensed refrigerant condition at an inlet of a compressor of the air conditioning system;

determining a sensed refrigerant condition at an outlet of the compressor;

determining a parabolic curve of a relationship between an air conditioning system performance metric and a speed of the condenser fan based on the determined inlet condition and the determined outlet condition;

identifying an optimum condenser fan speed based on a vertex of the parabolic curve; and controlling the speed of the condenser fan to meet the optimum condenser fan speed.

* * * * *